Dec. 14, 1926.

L. F. LAMPLOUGH 1,610,954

METHOD OF MAKING COMPOSITE ARTICLES

Filed Oct. 16, 1924

Inventor
Leslie F. Lamplough
by
Att'y.

Patented Dec. 14, 1926.

1,610,954

UNITED STATES PATENT OFFICE.

LESLIE FAWCETT LAMPLOUGH, OF CHICAGO, ILLINOIS, ASSIGNOR TO WESTERN ELECTRIC COMPANY, INCORPORATED, OF NEW YORK, N. Y., A CORPORATION OF NEW YORK.

METHOD OF MAKING COMPOSITE ARTICLES.

Application filed October 16, 1924. Serial No. 743,917.

This invention relates to a method of forming a composite article, and particularly to a method of forming a composite sheath for a core.

An object of the invention is to produce a relatively inexpensive composite article for covering cores and the like by a simplified and improved method.

In accordance with the features of the invention, a portion of material is applied to a portion of vulcanizable material which is so treated that the portions become self-attached to each other.

In a specific embodiment of the invention, rubber or a vulcanizable compound thereof is extruded around a continuously moving electrical conductor or other core and contemporaneously therewith a plurality of textile strands are applied in helical formation to the rubber in such manner that each strand contacts with the rubber throughout its entire length. The core with its coating of rubber and textile serving is contemporaneously subjected to a bituminous compound which is heated to a temperature which will effect vulcanization of the rubber after it has impregnated the strands and softened the rubber. The rubber, when softened, enters the interstices between the strands and causes the strands to adhere to the rubber coating which is subjected to the heated bitumen a sufficient length of time to cause vulcanization thereof.

Figure 1:
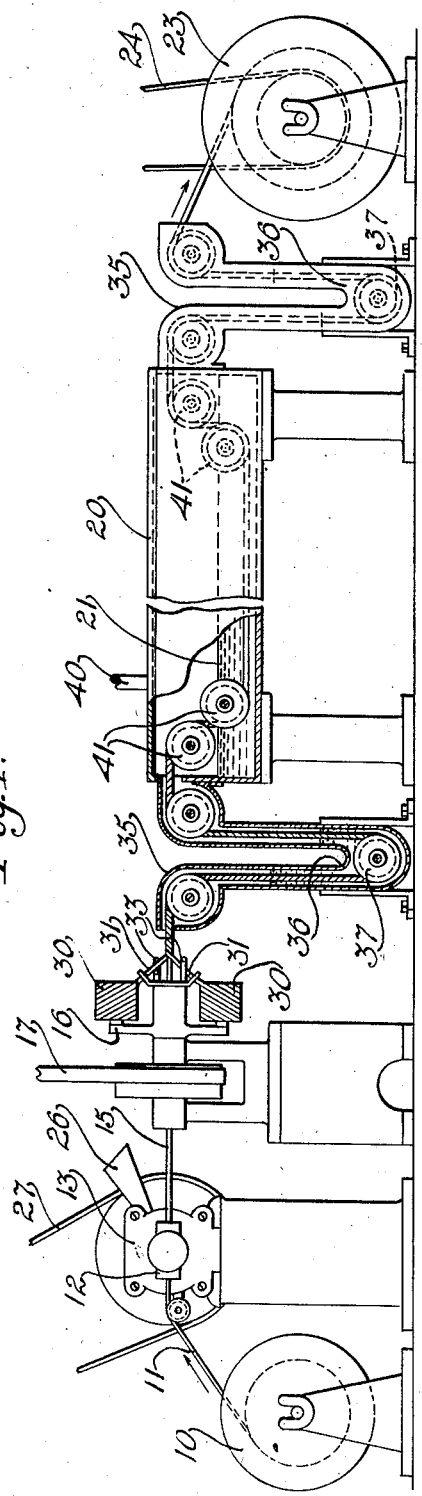
Figure 2:
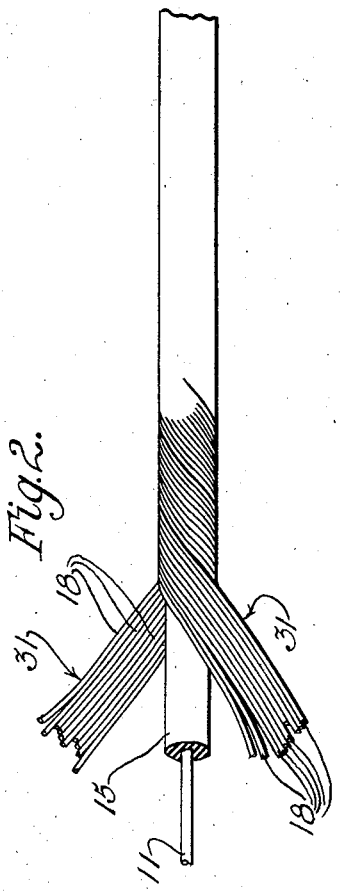

Other objects and features of the invention will become apparent as the detailed description progresses, reference being had to the accompanying drawing, wherein Fig. 1 is a somewhat diagrammatic view of apparatus for practicing the improved method, and Fig. 2 is a longitudinal elevation of a core having a sheath which has been formed by practicing the improved method.

Referring to the drawings, a rotatably mounted reel 10 carries an electrical conductor 11 in strand form which is hereinafter referred to as the core 11 and which is drawn through a die 12 of an extrusion machine 13 adapted to apply a coating 15 to the core, the coating consisting of a suitable plastic material, such as a vulcanizable rubber compound. The coated core then passes through a rotatable serving head 16 driven by a belt 17, which serving head 16 applies textile strands 18 to the coating 15. The term strand as used in the specification and appended claims refers to material having the configuration resembling a fiber, hair, filament, string, or the like, or in the nature of a cord consisting of fibers, or yarns twisted together. After leaving the serving head 16 the coated core passes through a housing 20 wherein the textile strands 18 are subjected to a bath comprising a heated bituminous compound indicated at 21. The sheathed core is then wound upon a rotatably mounted take-up reel 23 driven by a belt 24.

The extrusion machine 13 may be of any well-known type, such as is commonly employed in covering electrical conductors with vulcanizable rubber and it comprises a hopper 26 through which the material may be fed into a suitable feeding mechanism driven by a belt 27, the feeding mechanism supplying the material to the die 12 which forms the material into a uniform coating around the core. The rubber is preferably extruded at a temperature slightly below its vulcanizing temperature so that it may be vulcanized in a minimum amount of time during a contemporaneous step of the improved method.

The serving head 16 preferably comprises a plurality of cops 30 from which composite strands 31 are withdrawn and served to the coating 15, each composite strand 31 consisting of a plurality of the strands 18. Suitable guides 33 spread the strands 18 as they are applied to the coating 15 so that each strand 18 contacts throughout its entire length with the coating 15, and is equi-distantly spaced from the center of the core 11. The strands 18 are applied to the coating 15 in helical formation, each strand 18 being substantially in contact with the adjacent strands 18. The relatively large number of strands applied simultaneously to the coating make it possible to serve the strands in helices having a long pitch so that the coating 15 will be entirely covered by the strands when the extrusion machine 13 is operating at a relatively high speed.

Associated with the housing 20 are mercury seals 35 through which the coated and served core passes when it enters and leaves the housing. Each mercury seal 35 comprises a U-shaped tube 36 in which sheaves 37 are mounted to guide the coated core through a quantity of mercury held in the U-shaped tube. The mercury seals 35 permit the pressure within the housing 20 to be maintained at any desired value, the housing being connected to an air compressor or the like (not known) by a pipe 40.

The bituminous compound 21 is heated by any suitable means (not shown) to a temperature which is sufficiently high to effect vulcanization of the coating 15, sheaves 41 being provided to lead the coated core through the compound. The compound first impregnates the strands 18 so as to water-proof or weather-proof them and fluxes or softens the coating 15 in such manner that the vulcanizable material enters the interstices between the strands. The fibrous nature of the strands facilitates the task of impregnating them and readily permits the bituminous compound to come in contact with the coating 15. The coating 15 is subjected to the heated compound for a sufficient length of time to effect vulcanization thereof. The coating 15 and strands 18 then become firmly attached to each other.

What is claimed is:

1. A process of sheathing a core which comprises, applying a vulcanizable material to the core, applying an impregnable strand to the vulcanizable material, and vulcanizing the material in such a manner that the strand is impregnated and firmly attached to the vulcanized material.

2. A process of sheathing a core which comprises, applying a vulcanizable material to the core, applying an impregnable strand to the material in such a manner that it contacts therewith throughout its entire length, and vulcanizing the material to impregnate the strand and firmly attach it to the vulcanized material.

3. A process of sheathing a core, which comprises extruding vulcanizable material around the core, applying a plurality of strands to said material, and subjecting the coated core to a bituminous compound in such manner that the strands are impregnated with the bituminous compound and the said material is vulcanized.

4. A process of sheathing a core, which comprises extruding vulcanizable material around the core, contemporaneously therewith applying a plurality of strands to said material, and subjecting the strands to a heated bituminous compound in such manner that said material is vulcanized.

5. A process of sheathing a core, which comprises extruding vulcanizable material around the core, applying a covering thereto, and subjecting the covering to a heated bituminous compound in such manner that said material is first softened and then vulcanized to firmly attach the covering to the material.

In witness whereof, I hereunto subscribe my name this 24 day of September A. D., 1924.

LESLIE FAWCETT LAMPLOUGH.